Patented Oct. 12, 1954

2,691,634

UNITED STATES PATENT OFFICE 2,691,634

LUBRICANT COMPOSITION COMPRISING A MIXTURE OF WAXY MINERAL OIL, POLY-1,2 - OXY - PROPYLENEGLYCOL AND A PHTHALYL CHLORIDE ACYLATED TETRA-PARAFFIN-ALKYLATED PHENOL

George J. Benoit, Jr., San Anselmo, Calif., assignor to California Research Corporation, San Francisco, Calif., a corporation of Delaware No Drawing. Application June 29, 1951, Serial No. 234,479

3 Claims. (Cl. 252—52)

The present invention relates to the preparation of improved lubricating oil compositions. More particularly, the invention has to do with the preparation of lubricating oil compositions based on polyoxyalkylene polymeric material and mineral oil, said compositions having improved flow or pour characteristics.

The effect of pour point depressants on paraffinic mineral oils is well known. Good commercial depressants in amounts of 1% or less serve to lower the ASTM pour point appreciably. However, if the oil containing the pour depressant is subjected to alternate chilling and thawing, the pour point at the end of each cycle rises until a constant value is reached, which is in general only slightly below the pour point of the oil containing no depressant. This phenomenon is known as "pour point reversion," and the final pour point, as the "stable pour point."

Mixtures of mineral oil and polyoxyalkylene polymeric material, such as that derived from 1,2-propylene oxide, have heretofore been proposed as superior lubricant compositions. These mixtures have a particular utility in connection with the lubrication of moving parts, e. g., of an internal combustion engine, operating at low ambient temperatures. It is obviously desirable, therefore, that in such an application the pour point of the mixture be quite low, for example, —20° F. and lower in the case of a 10 W/20 oil.

Now, I have found that the incorporation into blends of paraffinic mineral oil and polyoxyalkylene polymeric material of a small amount of a pour depressant of a specific type, hereinafter to be more fully described, results in compositions having an unexpected lowered stable pour. More specifically, the pour point depressant contemplated by the present invention is of the "Santopour" type, that is, of a type derived from a hydroxyaromatic compound as hereinafter to be more fully described, and being soluble in the blend of mineral oil and polymeric material. I have found that the results sought are limited to the foregoing type of depressant, other conventional type depressants, such as "Paraflow" (condensation product of paraffin wax and naphthalene), and "Acryloid" (polymers of acrylic and/or methacrylic acid esters), being substantially without effect. Likewise I have found that these results are peculiar to blends of mineral oil and polyalkylene glycol polymeric materials.

More particularly, the pour point depressing materials I have reference to are:

1. The paraffin-alkylated hydroxyaromatic compound, such as tetra-alkylated phenol of U. S. Patent No. 2,191,499;

2. The ester derivative of the above compound obtained by treating it with an acylating agent, such as the phthalyl ester of tetra-wax phenol, and further described in U. S. Patent No. 2,138,809;

3. The product obtained as a result of the condensation reaction between a resinified hydroxyaromatic compound and chlorinated wax (U. S. Patent No. 2,061,008); or the resinified product of a hydroxyaromatic compound condensed with chlorinated wax (U. S. Patent No. 2,062,676). If desired these resinified products may be acylated.

According to the above-mentioned patents, hereby incorporated by reference, the hydroxyaromatic compounds that may be used are phenol, naphthol, and other hydroxy condensed ring compounds such as anthrol, together with derivatives of these hydroxy-substituted ring compounds. The following general formulas represent the compounds:

(1) 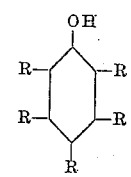

(2) 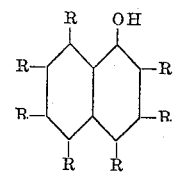

(3) 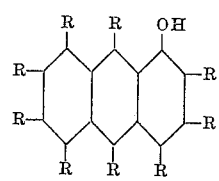

wherein R is a radical chosen from a group consisting of hydrogen, hydroxy, alkyl, aryl, alkaryl, alkoxy, and aroxy radicals. Preferably those compounds in which R is hydrogen or a hydroxyl group and which are represented by the single ring Formula 1 are preferred. Accordingly, the preferred specific compound is phenol. As examples of other specific compounds which may be mentioned, are catechol, rosorcinol, B-naphthol, benzyl phenol, p-cresol, hydroquinone, xylenol, phenyl ethyl phenol, methyl hydroxydiphenyl, ethyl hydroxydiphenyl, guaiacol, the monoethyl ether of catechol, methyl naphthol, tolyl naphthol, xylyl naphthol, benzyl naphthol, methoxyhydroxy naphthalene, anthranol, phenyl methyl anthranol, phenanthrol and the like.

The high molecular weight aliphatic compounds which have been found useful in practicing the present invention are those that characterize certain high molecular weight aliphatic hydrocarbons. These compounds usually consist of more than 20 carbon atoms in the molecule and have molecular weights of more than 250. This invention is concerned with the chlorine derivatives of compounds such as ceresin, ozocerite, paraffin wax, heavy paraffin oils, petrolatum, and similar hydrocarbons of a waxy nature. Particularly useful is crystalline paraffin of a melting point greater than 120° F. and of about 130° F.

*Preparation of the paraffin-alkylated hydroxyaromatic compounds*

The paraffin-alkylated hydroxyaromatic compounds are prepared by means of the Friedel-Crafts reaction involving the hydroxyaromatic compound and chlorinated hydrocarbon. In order to prepare the alkyl halide for the Friedel-Crafts synthesis, the aliphatic compound is first chlorinated by any suitable means. The chlorinated compound, for example, may be obtained by melting paraffin wax of a melting point of about 130° F., heating the molten wax to an elevated temperature of about 200° F., then bubbling gaseous chlorine through the liquid mass until the hydrocarbon has combined with about 14% chlorine.

In preparing the heavy alkyl-substituted hydroxyaromatic compound through the Friedel-Crafts reaction, as for example, between phenol and chlorparaffin, the proportion of reactants are so selected as to produce a triparaffin or tetraparaffin-substituted phenol, the tetraparaffin-substituted compound being preferred. In order to obtain this compound, for every equivalent of phenol employed, three, and preferably four, equivalents of chlorine as represented by the chlorparaffin, are employed. The chlorparaffin and phenol in the proper proportion are melted together and then heated to a temperature of about 150° F., after which about 3% of an hydrous aluminum chloride, based on the chlorparaffin, is added a little at a time and with constant agitation to the molten mixture and then the reaction mixture is slowly heated to a temperature of about 350° F., a heating time of about two hours being satisfactory. If evolution of gas has not ceased by the time a temperature of 350° F. is reached, the mixture is held at this temperature until all evolution of gas has ceased. Usually at this stage of the reaction an aluminum chloride sludge will begin to settle quite rapidly to the bottom of the reaction vessel and a translucent solution layer appears above the sludge. After completion of the reaction the paraffin-alkylated hydroxyaromatic compound is purified in any suitable manner, as for example, by drawing off the liquid layer, then washing several times with warm water to rid it of any residual hydrochloric acid, and then distilling.

*Preparation of the ester of a paraffin-alkylated hydroxyaromatic compound*

As hereinbefore mentioned, ester derivatives of the paraffin-alkylated hydroxyaromatic compounds are suitable pour point depressants. As esterifying or acylating agents a wide number of acid chlorides or anhydrides are suitable. The following are suitable organic acylating agents: the monobasic saturated aliphatic acids from acetic acid up to and including montanic acid; monobasic unsaturated aliphatic acids, such as acrylic; aliphatic saturated and unsaturated polybasic acids, such as oxalic and fumaric acid, respectively; substituted aliphatic mono and polybasic acids, the substituent groups being halogen, amino, or hydroxyl groups; aromatic mono and polybasic acids such as benzoic and phthalic, respectively; alkene-substituted aromatic monobasic acids such as cinnamic; substituted mono and polybasic aromatic acids, such as chlorobenzoic, salicylic, toluic, etc., aryl-substituted mono and polybasic aliphatic acids with the carboxyl group occurring in the aliphatic portion of the molecule; heterocyclic acids, such as furoic; alicyclic acids, such as abietic.

In general, I prefer a dibasic acid, such as phthalic, as the esterifying acid.

In the acylating operation, the acid halide or anhydride is added after the Friedel-Crafts reaction is completed, that is, when all evolution of gas at a temperature of around 350° F. has ceased. The mixture is then cooled to a point below 350° F. but above 100° F. The esterification reaction proceeds rapidly and is complete upon cessation of all evolution of gas. The esterified paraffin-alkylated product may then be purified in a similar manner in which the intermediate product, the paraffin-alkylated hydroxyaromatic compound, is isolated, that is, by drawing off the liquid layer, washing this layer extensively with water and subsequently distilling.

*Preparation of the condensation product between a resinified hydroxyaromatic compound and chlorinated paraffin*

In the preparation of the resinified hydroxyaromatic compound prior to condensing it with the chlorinated paraffin by means of the Friedel-Crafts reaction, suitable resinifying agents are halogenated organic compounds, halogenated aralkyl or aryl hydrocarbons, as for example, benzyl chloride and chloronaphthalene; aldehydes, which eliminate water in the reaction with the hydroxyaromatic compound, such as formaldehyde; alcohols, ketones, and polyhydric compounds such as butyl alcohol, acetone and glycol, which also eliminate water in the reaction; elemental sulfur and sulfur compounds, such as sulfur monochloride, with the elimination of hydrogen sulfide. In general, preference is for the aldehyde type of resinifying agent.

The reaction between an aldehyde and a hydroxyaromatic compound readily occurs in an acid or basic medium. For example, the reaction between butyraldehyde and phenol readily takes place at a temperature of about 212° F. in the presence of about 1 per cent hydrochloric acid catalyst, the proportion of the reactants being ½ mole of the aldehyde to 1 mole of phenol. After completion of the resinification reaction, the resin may be purified by subjecting it to a vacuum distillation to remove unreacted products.

In preparing the hydroxyaromatic-sulfur resin either elemental sulfur or a compound thereof, such as sulfur monochloride is suitable. The reaction between sulfur monochloride and the hydroxyaromatic compound occurs readily, and no catalyst is necessary. Since the solubility of the sulfur resin depends on the degree of combined sulfur, that is, the greater the sulfur content the less the solubility, the most suitable hydroxyaromatic-sulfur resin is one that has not more than one atomic weight of sulfur combined with each mole of hydroxyaromatic compound.

While the foregoing describes the preparation of the resin by reacting a hydroxyaromatic compound with a suitable resinifying agent, I may also prepare the resin through the reaction of an oxyaromatic compound with a suitable resinifying agent. As examples of suitable oxyaromatic compounds may be mentioned the aromatic ethers, such as anisole (phenyl methyl ether) and beta-naphthyl methyl ether. A suitable resinifying agent is an aldehyde, such as formaldehyde. The resinification reaction between an aromatic ether and the aldehyde proceeds less readily than is the case with the hydroxyaromatic compounds. The reaction between an oxyaromatic compound and an aldehyde, such as formaldehyde, may be accelerated by employing a higher concentration of an acid catalyst, concentrated sulfuric acid being preferred. Often it is desirable to use a solvent for the mixture. A suitable solvent is glacial acetic acid.

In preparing the oxyaromatic-aldehyde resin, anisole, acetic acid, and trioxymethylene are mixed together. For every mole of anisole, 10.8 g. of trioxymethylene, and 1½ mole of glacial acetic acid are employed. To this mixture about 43 cc. of concentrated sulfuric acid are added slowly with cooling, so that the reaction temperature is maintained below 50° C. After the addition of all the sulfuric acid, the mixture is stirred for about 2 hours at 50° C. The resin is then purified by washing with water, dissolving in a suitable solvent such as benzene, washing with alkali to rid the product of all acid, distilling off the solvent, and further purifying by vacuum distillation.

The condensation reaction between the resin and the chlorinated paraffin is carried out in about the same manner as is employed in condensing the unresinified hydroxyaromatic compound with the chlorparaffin, that is, the chlorparaffin is melted, the resinified hydroxyaromatic compound or oxyaromatic compound is mixed therewith, aluminum chloride is added, and the mixture heated to a maximum of 350° F. If difficulty is encountered in mixing the resin with the paraffin, a solution of resin in a suitable solvent, such as ethylene dichloride, may be advantageously employed. In this case, the addition of aluminum chloride takes place at the boiling temperature of the solvent, after which the solvent is distilled off and the elevated temperature of 350° F. is reached. When the reaction between the resin and chlorparaffin is completed, usually after one hour, the final product is isolated in the usual manner of purifying Friedel-Crafts reaction products. The liquid layer is decanted, dissolved in any suitable solvent such as ether to aid in the subsequent washing operations; the solvent is then distilled off, and the compound further purified by distillation, such as by vacuum distillation at 5 mm. and at a temperature of about 350° C.

In general, the class of resinifying agents employed in the resinification of the unsubstituted oxyaromatic compound are suitable for the resinification of the compound after alkylation, although the introduction of alkyl groups into the oxyaromatic compound makes the compound less reactive to these agents.

*Polyoxyalkylene polymeric material*

The preferred polyoxyalkylene polymeric material contemplated by the invention has the structural configuration

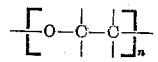

This material is prepared from the alkylene oxides, such as ethylene oxide, 1,2-propylene oxide, the butylene oxides and higher homologs, mixtures thereof, and the corresponding alkylene glycols. The resulting products may be polyoxyalkylene diols or polyalkylene glycol derivatives, in which one or both of the terminal hydroxyl groups have been removed either during the polymerization reaction or subsequently thereto, as by etherification or esterification, to yield mono- or di-ether or mono- or di-ester groups, or combinations of such terminal groups, whereby certain desirable properties are imparted to the final polymeric mixture.

For example, U. S. Patent No. 2,448,664 describes the preparation of polyoxypropylene polymeric mixtures of lubricating oil viscosity ranging in molecular weight from around 500 to 2,000 and higher. The reaction may be represented as follows:

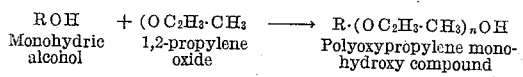

The preparation of copolymeric polyalkylene oxide mixtures from ethylene oxide and propylene oxide are described in U. S. Patent Nos. 2,425,755 and 2,425,845. U. S. Patent No. 2,457,139 describes esters of polyoxyalkylene diols derived from a copolymer of ethylene oxide and 1,2-propylene oxide, while U. S. Patent No. 2,480,185 describes esters of polyoxyalkylene monohydroxy compounds derived from the same copolymer. Diethers of polyoxyalkylene diols derived from ethylene oxide and propylene oxide are described in U. S. Patent No. 2,520,611, and U. S. Patent No. 2,520,612 describes diethers of polyoxypropylene diols. Preferably employed in accordance with the invention is the diether of polyalkylene glycol or the monoether monoester of polyalkylene glycol, derived most advantageously from 1,2-propylene oxide.

Also contemplated by the invention are polyoxyalkylene polymeric and copolymeric mixtures containing polymer units having more than two carbon atoms separating oxygen atoms in the polymer chain. For example, U. S. Patent No. 2,520,733 describes polymers and copolymers prepared from trimethylene glycol.

The polymeric materials hereinabove described, as well as additional suitable polymeric materials of the character indicated are described in U. S. Patent No. 2,491,432.

*Blend of mineral oil and polymer*

In forming the blend of polyalkylene glycol polymer material and mineral oil, any waxy mineral or hydrocarbon oil of lubricating oil viscosity can be employed. It can be an unrefined mineral oil or a distillate derived from paraffinic or mixed base crudes. Moreover, the oil may be an oil refined by conventional methods, such as solvent- or acid-treated hydrocarbon oils or mixtures thereof. If desired, synthetic hydrocarbon oils derived from the polymerization of olefins or the Fischer-Tropsch process can be employed. Various blended oils are also contemplated by the invention.

As hereinbefore stated, the compositions of the invention are especially useful for low temperature operation of internal combustion engines, and compositions satisfying the requirements of a 10 W/20 oil are particularly useful. Accordingly the preferred polymeric material ranges in molecular weight from about 400 to about 950, most advantageously, from about 550 to about 700; and has a viscosity of about 35 to 60 SSU at 210° F., most advantageously between about 40 and 50 SSU at 210° F. The viscosity of the mineral oil on the other hand will depend on the viscosity of the polymer, the viscosity desired in the final blend, and the mineral oil content of the blend. In general, the viscosity of the mineral oil at 210° F. is in the range of about 35 SSU to about 100 SSU, preferably 50 to 70. The viscosity of the mineral oil at lower temperatures, e. g., 100° F. can vary over a wide range, depending on the viscosity of the mineral oil at 210° F., the viscosity index of the mineral oil (ranging from about 30 to 110, preferably 50 to 100), and the fraction of mineral oil in the blend. Additional description of preferred mineral oil and polymer appears in the copending application of William T. Stewart and George J. Benoit, Jr., filed August 7, 1950, and bearing Serial No. 178,165, now abandoned.

Blends of hydrocarbon oil and polymer contemplated by the present invention contain 25 to 75 volume per cent of either one of the components, and the remainder, the other component; that is, either of the components may be present in an amount of one-third to threefold the amount of the other. The preferred blend, however, contains an amount about equal by volume of mineral oil and polymer, that is, about 50 volume per cent of each component.

Effective amounts of pour point depressing material ranges from about 0.5% to 5% by weight of the finished composition. Moreover, the herein described pour point depressing substance has been found to be effective in compositions containing certain additives employed to modify the properties of the composition. Among these additives may be mentioned detergents, such as alkaline earth phenates; corrosion and oxidation inhibitors, such as certain aromatic amines, metal dithio carbonates; viscosity index improvers; defoaming agents; metal deactivators, etc.

The following example is illustrative of the invention:

(a) Paraffin base 480 neutral mineral oil having a viscosity index of 85, an ASTM pour point of about 5° F., and a stable pour point of about 5° F., was treated with about 3% of a phthalyl chloride acylated tetraparaffin-alkylated phenol. The stable pour point of the resulting mixture was —10° F.

(b) A mixture was formed employing 60 volume per cent of the oil described in (a) and 40 volume per cent of 1,2-polypropylene glycol monoisooctyl ether acetate having a molecular weight of about 500. The stable pour point of this mixture was about 5° F.

(c) Incorporation in the mixture of (b) of about 3% of the phthalyl chloride acylated tetraparaffin-alkylated phenol mentioned in (a), and hereinafter more fully defined, resulted in a mixture having a stable pour point of —25° F.

(d) Addition of 3% "Acryloid" and 3% "Paraflow" to separate samples of mixture (b) lowered the stable pour to only 0° F. and —10° F., respectively.

The stable pour points mentioned in the foregoing example were determined according to Federal Specification Mil-O-2104 (ORD), paragraph 4.3.3. The acylated tetraparaffin-alkylated phenol was prepared by means of the Friedel-Crafts synthesis employing 1,000 g. chlorinated paraffin wax, 92.5 g. phenol, 100 g. of the isolated alkylated phenol then being treated with about 10 g. phthalyl chloride for about 15 minutes at a temperature between about 175° F. to 250° F. to give the high molecular weight alkyl phenyl phthalate.

Another example of the invention is as follows:

(a) About 75 parts by volume of the paraffin base 480 neutral mineral oil employed above and 25 parts 185 paraffin base bright stock having an ASTM pour of 10° F. and a V. I. of 85 were blended. The blend had a stable pour of 10° F.

(b) The mixture of (a) was mixed, in equal volumes, with polypropylene glycol butyl methyl diether having a molecular weight of about 500. The stable pour of this mixture was 10° F.

(c) Addition of 2% to the mixture of (b) of the phthalyl chloride acylated tetraparaffin-alkylated phenol employed in the foregoing example, lowered the stable pour of the mixture to —20° F.

(d) To separate samples of the mixture of (b) there were added 2% "Acryloid" and 2% "Paraflow." The stable pours were 0° F. and —5° F., respectively. The stable pour point in this example was determined as above indicated.

Obviously many modifications and variations of the invention hereinbefore set forth may be made without departing from the spirit and scope thereof, and, therefore, only such limitations should be imposed as are indicated in the appended claims.

I claim:

1. A lubricant composition comprising a mixture of a waxy mineral oil and a poly-1,2-oxypropylene glycol in the proportion of from 25 to 75% by volume of the mineral oil and from 75 to 25% by volume of the glycol, together with from about 2% to about 3%, by weight, of a phthalyl chloride acylated tetraparaffin-alkylated phenol.

2. The composition of claim 1 wherein the poly-1,2-oxypropylene glycol material is the monoisooctyl ether of poly-1,2-oxypropylene glycol acetate.

3. The composition of claim 1 wherein the poly-1,2-oxypropylene glycol material is the butyl methyl diether of poly-1,2-oxypropylene glycol.

References Cited in the file of this patent

UNITED STATES PATENTS

| Number | Name | Date |
|---|---|---|
| 2,114,812 | Reiff et al. | Apr. 19, 1938 |
| 2,138,809 | Reiff et al. | Nov. 29, 1938 |
| 2,510,540 | Ballard et al. | June 6, 1950 |
| 2,520,733 | Morris et al. | Aug. 29, 1950 |
| 2,543,735 | Stewart et al. | Feb. 27, 1951 |

OTHER REFERENCES

Petroleum Refiner, vol. 28, No. 6, June 1949, pages 98–100 pertinent. (Copy in Scientific Library.)